Patented Apr. 12, 1932

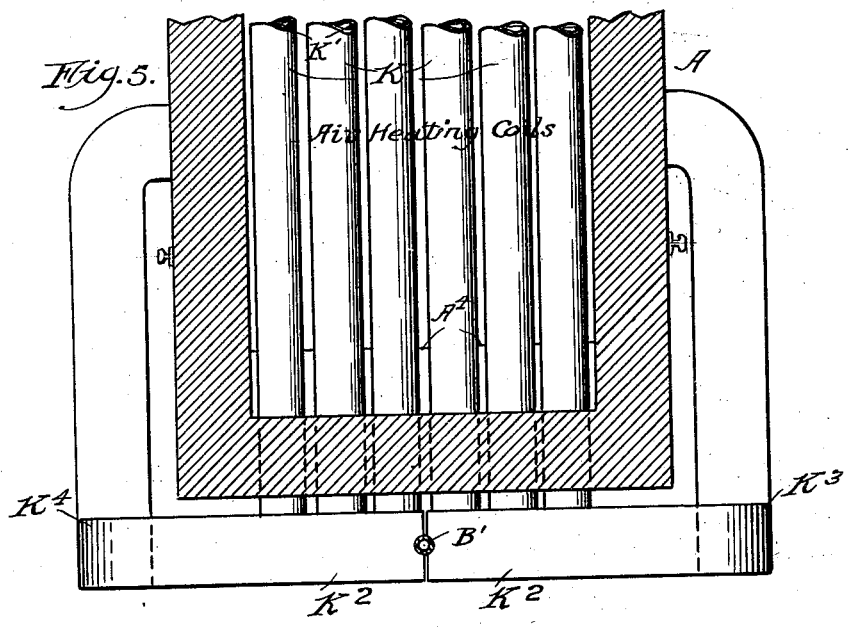

1,853,965

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

PROCESS FOR PRODUCING LOWER BOILING POINT HYDROCARBONS

Continuation of application Serial No. 389,213, filed June 15, 1920, which is a division of application Serial No. 260,957, filed November 4, 1918. This application filed January 13, 1927. Serial No. 161,003.

This application is a continuation of application Serial No. 389,213, filed June 15th, 1920, which latter application constitutes a division of application Serial No. 260,957, filed November 4th, 1918.

The objects of the invention are to provide a process for separating oils of different boiling points; to provide a process wherein the oil under treatment is circulated through a coil and then to and from a vapor chamber which latter chamber is only partly filled with the oil, the oil being heated as it passes through the former coil and as it passes through the latter chamber and the oil being relieved of more or less of its vapor content, which vapors pass to and through a condenser while more or less of an insoluble material, such as carbon formed in the oil, settles and is drawn off while the remaining unvaporized oil passes from the larger chamber back to and through the heating tubes, the whole being maintained under pressure; to provide a process in which the heating of the oil under treatment is accomplished in the heating coils and said oil maintained in rapid circulation in these coils and then discharged into one end of the vapor chamber, said chamber being only partially filled with the oil and the lighter portions of said oil withdrawn from said chamber at the other end forced back through the heating coil, while more or less of the oil and carbon and other solids are drawn off as residuum, said vapor chamber being of such size in the cross section as to greatly reduce the speed of the flow of the oil from one end to the other and said chamber being of such dimensions as to permit more or less of its solid content to settle out and means being provided for the drawing off of more or less of the solids that are thus settled out of the oil along with part of the oil and means provided for supplying fresh oil to the apparatus; to provide a process for continuous operation; to provide a process in which those products that are only partly reduced or converted to the desired low boiling point, are returned and further circulated through the heating tubes in the larger chamber; to provide a process in which the vapors not having the desired low boiling points are condensed and automatically returned for further treatment; to provide a process whereby the free carbon produced can be settled out and removed without interrupting the operation of the still; to provide a process whereby any settlement of carbon on the heating tubes will be indicated before the particular part of the apparatus where such carbon settled is injured; to provide a process for controlling the rate of flow of the oil through the heating tubes by means of a pump or otherwise so as to more or less prevent the carbon and other solid matters from settling in such tubes; to provide a process for maintaining the oil in the heating tube under sufficient flow as to maintain the small solid matters contained therein in suspension; to provide a process in which oil is automatically fed into the apparatus and removed therefrom and automatically maintained at a predetermined level in the larger tubes; to provide a process for passing the distillates from the reflux condenser into the heating coils; to provide a process for preheating the fresh air supplied to the furnace by utilizing the heat from the waste gases of said furnace; to provide in general a process of the character referred to.

In the drawings:

Fig. 5 is a plan view of one end of the furnace showing the air conduits connected with the conduit carrying the heated air to the furnace proper.

Fig. 6 is an end view of the furnace in section showing the air conduits and also the connection between the heating coils and the large coils.

Figure 1:
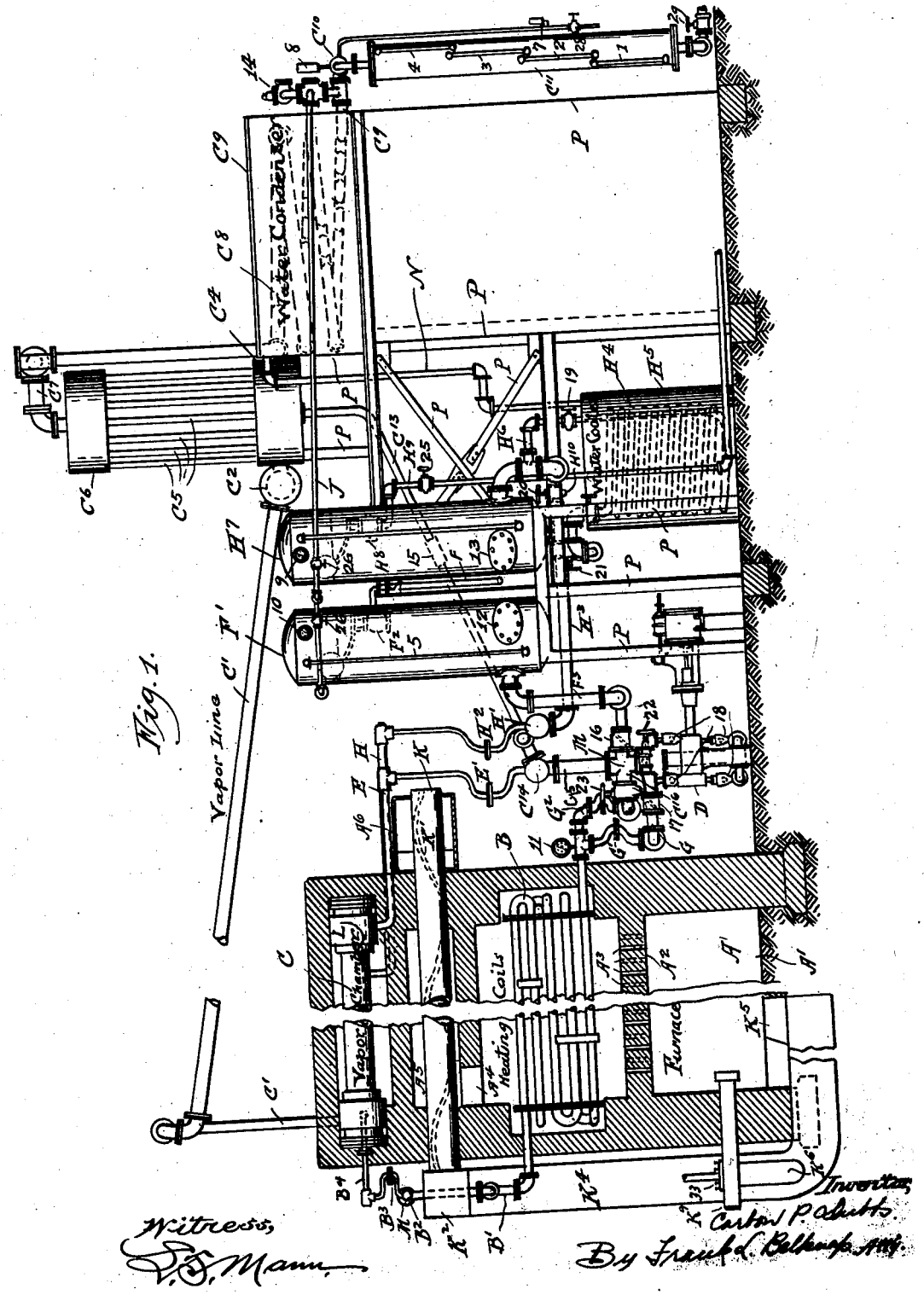
Fig. 1 is a view in side elevation of the apparatus partly in section and partly broken away.
Figure 2:
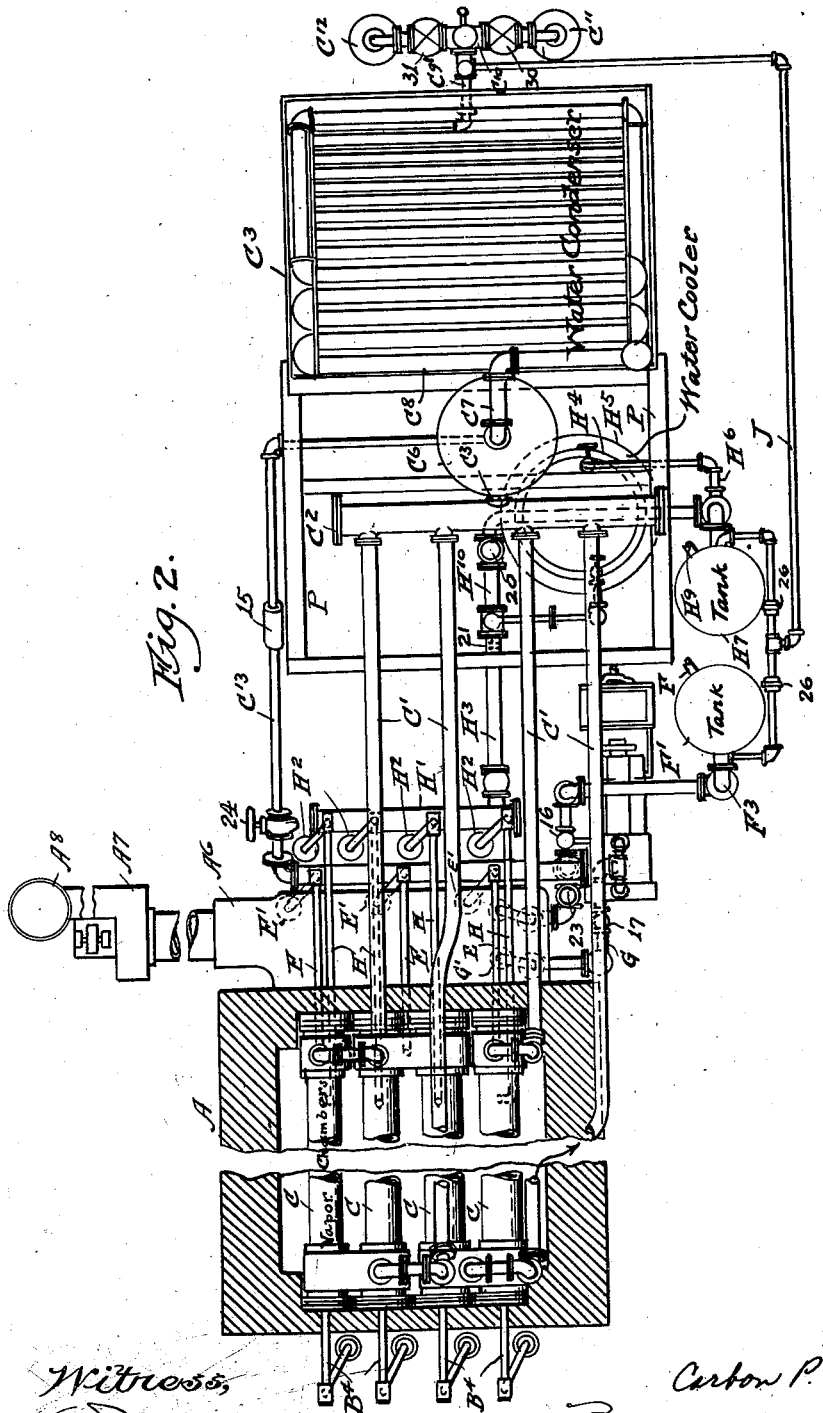
Fig. 2 is a plan view partly in section of the entire apparatus.
Figure 3:
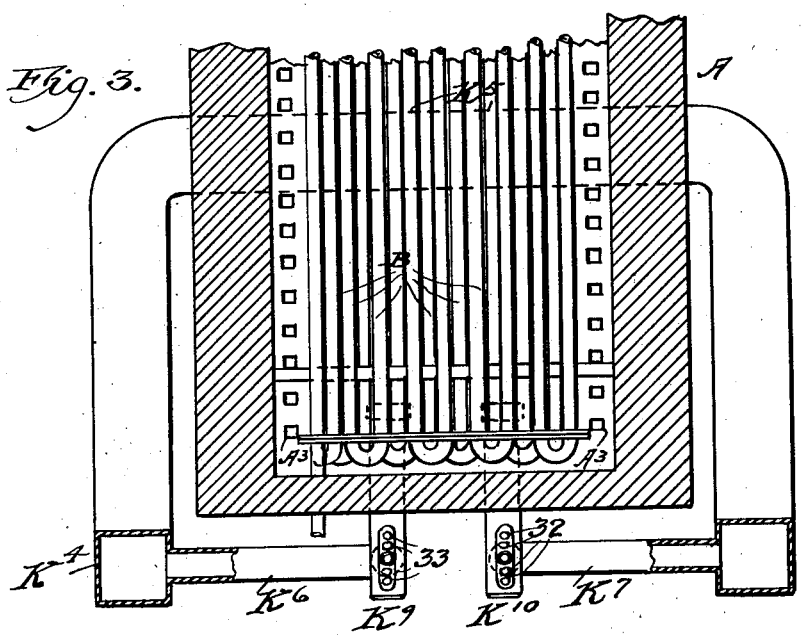
Fig. 3 is a plan view of one end of the furnace showing the conduits for carrying the heated air to the gas burners and furnace proper and also showing the heating coils.
Figure 4:
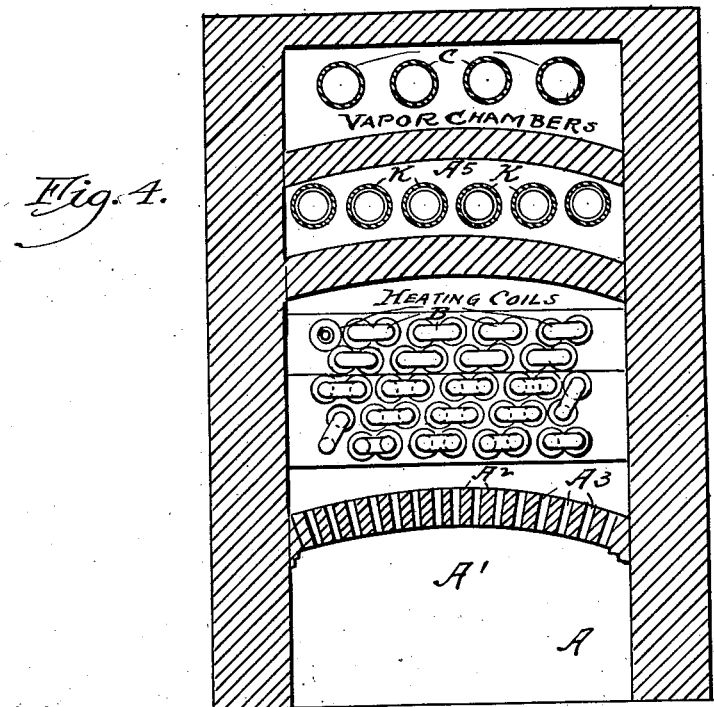
Fig. 4 is an end view in section of the furnace showing the heating coils with air conduits and the vapor chamber.

Referring to the drawings, A—1 is the furnace proper. A—2 is an arch in the furnace having positioned in it, holes marked A—3 through which the heat and gases of combustion pass. A—4 is a flue opening into heat interchanging chamber A—5 which connects with flue breeching A—6, which connects with flue blower A—7 and with stack A—8. B are the heating coils which, by means of pipe B—1, manifold B—2, expansion joints B—3, and pipes B—4 connect with vapor chambers C and leading from these chambers are vapor lines C—1, connecting with manifold C—2 which connects, by means of pipe C—3 to header C—4 which header is connected by means of tubes C—5 to header C—6 and out of which header extends pipe C—7 which connects with coil C—8, positioned in the water tank C—9. Coil C—8 is connected by means of pipe C—9' to manifold C—10 to receivers C—11 and C—12. Out of the bottom of header C—4 extends line C—13 and connects with manifold C—14 which connects by means of pipe C—15 to header C—16 and this header is connected with pump D. Extending from the vapor chambers are pipes E with expansion swings E—1 connecting to manifold C—14. F is the supply line to tank F—1 through float controlled valve F—2 and from this tank extends line F—3 to manifold C—16. G is the discharge from the pump D to the coils B having on it expansion joint G—1. G—2 is a by-pass around the pump D. H are lines extending from the bottom of the vapor chamber to manifold H—1 and having expansion joints H—2. This manifold H—1 is connected by means of pipe H—3 to water cooled coil H—4 positioned in tank H—5, and the said coil is connected by line H—6 to tank H—7. Through float valve H—8 the tank H—7 has discharge to line H—9. From tanks F—1 and H—7 is gas line J, connecting manifold C—10. K are the hot air conduits having baffle plates K—1 in them and connected with header K—2 having branches K—3 and K—4 extending down to the furnace through tunnel K—5 having branches K—6 and K—7 to gas burners K—9 and K—10. H—10 is a by-pass around the water cooling coil H—4. 1, 2, 3, 4, 5, and 6 are liquid level gauges. 7, 8, 9, 10 and 11 are pressure gauges. 12 and 13 are manhole heads. 14 is a pressure relief valve. 15 is an expansion sleeve. 16 and 17 are check valves. 18 are pump valves. 19, 20, 21, 22, 23, 24, 25, 26, 27, 28, 29, 30, 31, 32 and 33 are valves. L are baffle plates positioned in the vapor chambers. M are cable connections for pyrometers. N is a water overflow from tank C—9 into tank H—5. P are supports for the different parts of the apparatus.

Describing now the operation of the process, the oil to be treated is forced by means of a pump or other means not shown, inward through line F through float valve F—2 opening whenever the oil in tank F—1 falls below the predetermined level and flows from there through line F—3 continuously through check valve 16 into manifold C—16 into pump D constantly operating and is discharged through check valve 17 through line G into heating coils B and into line B—1 and the manifold B—2 through lines B—4 into vapor chambers C and from said chambers flows through lines E through expansion joints E—1, into manifold C—14 and back into manifold C—16 and into the pump and then back through the system as described. Fire is placed in the furnace A—1 and passes up through openings A—3 around the tubes B through flue A—4 through chamber A—5 and through breeching A—6. The air for supply in the furnace is drawn from the atmosphere through tubes K and as it passes through chamber A—5 the heat from the waste furnace gases, passing through chamber A—5 preheats this air in the tubes K and the heated air passes through manifold K—2 into branches K—3, K—4 into the furnace through tunnel K—5 and to the gas burners K—9 and K—10 through branches K—6 and K—7.

The vapors liberated in the chambers C pass up through vapor lines C—1 into manifold C—2 into header C—4 through pipes C—5 into header C—6 through pipe C—7, through water cooled coil C—8 through manifold C—10 and from there go into receivers C—11 and C—12 and are drawn off through valve 29 to any suitable storage, not shown, and the excess gas discharged through valve 28. The reflux condensate from the header C—4 flows freely through the line C—13 into the header C—14 where it mixes with lighter unvaporized oil from the chambers C and the mixture is introduced through the line C—15 to the pump D and conveyed back to the cracking coil. The pipes E communicating with the vapor chambers C are so positioned that they withdraw the lighter residue from these chambers while the heavier carbon bearing substances are withdrawn through the pipes H for storage and subsequent use.

The pressure in tanks F—1 and H—7 is maintained uniform by means of line J connecting the incondensible gases under pressure with these tanks. The heavier unvaporized oil in the tubes C is drawn off either continuously or intermittently through lines H, through expansion swings H—2, into manifold H—1, through line H—3 through valve 21 through water cooled coil H—4, through line H—6, into tank H—7. The oil can be discharged into tank H—7 through line H—3 without going through the water cooled coil H—4 by closing the valves 19 and 21 and opening valve 20, and passing the oil through line H—10. The level of the oil in the tank H—7 is controlled by float valve H—8 which opens when the oil in tank H—7 rises above the predetermined level and the oil is discharged through line H—9, valve 25 to any desirable storage not shown.

It will readily be seen that this arrangement provides for a continuous operation, for the automatic maintenance of a definite level of liquid in the vapor chamber. The automatic utilization of the waste heat in the flue gases, the automatic control of the residuum withdrawn from the apparatus, means for circulation by convection without the use of the pump, the return of the reflux distillates to the heating zone and thus allow a uniform temperature to be maintained in the oil in the vapor chamber. It will be understood that the rate at which the oil will be circulated through the apparatus will be governed by the different factors such as the amount distilled off, the character of the oil being treated, etc., and the temperature used in the furnace, these factors having a bearing on the amount of solid material contained in the oil such as carbon, and the amount of agitation or velocity necessary to maintain same in suspension in the heating coils will vary. The entire system is subjected to a pressure either vapor or gas or otherwise created which pressure will range from 50 to 500 pounds per square inch more or less, with pressure unit varying in accordance with conditions to be met.

The temperature at which the oil is to be heated will vary approximately from 400° F. to 1200° F. more or less, although these limits are not absolute in either case. By this arrangement, a much hotter furnace temperature can be used in the furnace and a more economical fuel consumption obtained.

I claim as my invention:

1. A process for cracking oil, comprising raising the oil to a cracking heat while flowing through a coil located in a heating zone, in delivering the heated oil from the coil to an enlarged vapor chamber, wherein a predetermined liquid level is maintained, in separately removing light unvaporized oil and heavy unvaporized oil from said vapor chamber, in passing vapors evolved from the oil to a dephlegmator, in uniting reflux condensate separated from the vapors with the light unvaporized oil removed from said vapor chamber, in thereafter uniting said commingled reflux condensate and light unvaporized oil with a regulated quantity of fresh incoming charging stock, in supplying the resulting mixture to said heating coil, in maintaining a predetermined body of the heavy unvaporized oil removed from said vapor chamber in a zone apart from the vapor chamber, and in controlling the removal of heavy unvaporized oil from said vapor chamber by variations in the volume of oil in said zone.

2. A process for cracking oil, comprising raising the oil to a cracking heat while flowing through a coil located in a heating zone, in delivering the heated oil from the coil to an enlarged vapor chamber, wherein a predetermined liquid level is maintained, in separately removing light unvaporized oil and heavy unvaporized oil from said vapor chamber, in passing vapors evolved from the oil to a dephlegmator, in uniting reflux condensate separated from the vapors with the light unvaporized oil removed from said vapor chamber, in thereafter uniting said commingled reflux condensate and light unvaporized oil with a regulated quantity of fresh incoming charging stock, in supplying the resulting mixture to said heating coil, in admitting heavy unvaporized oil removed from said vapor chamber to a zone apart from the vapor chamber, in which zone a liquid level is maintained, which is responsive to changes in the predetermined liquid level maintained in said vapor chamber, and from which zone the heavy unvaporized oil is automatically discharged, when the liquid level in the vapor chamber rises above the predetermined liquid level desired to be maintained therein.

3. A process for cracking oil, comprising raising the oil to a cracking heat while flowing through a coil located in a heating zone, in delivering the heated oil from the coil to an enlarged vapor chamber, wherein a predetermined liquid level is maintained, in separately removing light unvaporized oil and heavy unvaporized oil from said vapor chamber, in passing vapors evolved from the oil to a dephlegmator, in uniting reflux condensate separated from the vapors with the light unvaporized oil removed from said vapor chamber, in thereafter uniting said commingled reflux condensate and light unvaporized oil with a regulated quantity of fresh incoming charging stock, in supplying the resulting mixture to said heating coil, in maintaining a volume of the heavy unvaporized oil removed from said vapor chamber under the same pressure as that prevailing in the vapor chamber, in a zone apart from the vapor chamber, and in controlling the removal of heavy unvaporized oil from said vapor chamber by variations in the volume of oil in said zone.

4. A process for cracking hydrocarbon oil, comprising raising the oil to a cracking heat while flowing through a coil positioned in a heating zone, in delivering the heated oil from the coil to an enlarged vapor chamber, wherein a predetermined liquid level is maintained, in removing heavy unvaporized oil from said vapor chamber, in passing vapors evolved from the oil to a dephlegmator, wherein insufficiently cracked fractions are condensed, forming reflux condensate, in uniting such reflux condensate separated from the vapors with a quantity of fresh incoming charging oil for the process and in forcing the resulting commingled oils through said heating coil, to be again admitted to said vapor chamber, in admitting heavy unvaporized oil removed from said vapor chamber to a zone apart from the vapor chamber, in which zone a liquid level is maintained, which is responsive to changes in the predetermined liquid level maintained in said vapor chamber, and from which zone the heavy unvaporized oil is automatically discharged, when the liquid level in the vapor chamber rises above the predetermined liquid level desired to be maintained therein.

CARBON P. DUBBS.